(12) United States Patent
Blondel et al.

(10) Patent No.: US 9,708,489 B2
(45) Date of Patent: Jul. 18, 2017

(54) COMPOSITION COMPRISING A SEMI-AROMATIC POLYAMIDE AND A CROSSLINKED POLYOLEFIN

(71) Applicant: ARKEMA FRANCE, Colombes (FR)

(72) Inventors: Philippe Blondel, Bernay (FR); Franck Gerard, Fontaine L'Abbe (FR)

(73) Assignee: ARKEMA FRANCE, Colombes (FR)

( * ) Notice: Subject to any disclaimer, the term of this patent is extended or adjusted under 35 U.S.C. 154(b) by 119 days.

(21) Appl. No.: 14/351,197

(22) PCT Filed: Oct. 8, 2012

(86) PCT No.: PCT/FR2012/052275
§ 371 (c)(1),
(2) Date: Apr. 11, 2014

(87) PCT Pub. No.: WO2013/054025
PCT Pub. Date: Apr. 18, 2013

(65) Prior Publication Data
US 2014/0296385 A1    Oct. 2, 2014

(30) Foreign Application Priority Data
Oct. 13, 2011    (FR) .................................... 11 59259

(51) Int. Cl.
| | | |
|---|---|---|
| *C08L 77/06* | (2006.01) | |
| *C08L 23/08* | (2006.01) | |
| *C08L 33/06* | (2006.01) | |
| *B32B 27/34* | (2006.01) | |

(52) U.S. Cl.
CPC .............. *C08L 77/06* (2013.01); *B32B 27/34* (2013.01); *C08L 23/0846* (2013.01); *C08L 23/0869* (2013.01); *C08L 33/064* (2013.01); *C08L 23/0884* (2013.01); *C08L 33/068* (2013.01); *C08L 2205/22* (2013.01)

(58) Field of Classification Search
CPC ...................................................... C08L 77/00
See application file for complete search history.

(56) References Cited

U.S. PATENT DOCUMENTS

| | | | |
|---|---|---|---|
| 9,102,828 B2 * | 8/2015 | Blondel | .................. C08L 77/00 |
| 2003/0008976 A1 | 1/2003 | Bouilloux et al. | |
| 2011/0206881 A1 | 8/2011 | Briffaud et al. | |
| 2012/0202896 A1 | 8/2012 | Blondel et al. | |

FOREIGN PATENT DOCUMENTS

| | | |
|---|---|---|
| EP | 1505099 A2 | 2/2005 |
| JP | H10298431 A | 11/1998 |
| WO | 2011/015790 A2 | 2/2011 |

OTHER PUBLICATIONS

International Search Report dated Feb. 8, 2013 issued in corresponding PCT/FR2012/052275 application (pp. 1-2).
Machine translation of JPH10298431A dated Nov. 10, 1998 to Toray Industries.

\* cited by examiner

*Primary Examiner* — Megan McCulley
(74) *Attorney, Agent, or Firm* — Millen, White, Zelano and Branigan, P.C.

(57) ABSTRACT

A composition comprising a copolyamide and a crosslinked polyolefin. The present invention relates to a composition comprising at least one semi-aromatic polyamide and at least one crosslinked polyolefin, wherein the crosslinked polyolefin is obtained from at least one product (A) comprising an unsaturated epoxide and from at least one product (B) comprising an unsaturated carboxylic acid anhydride. According to the invention, the weight contents of (A) and (B), denoted respectively [A] and [B], are such that the [B]/[A] ratio is between 3 and 14.

9 Claims, 1 Drawing Sheet

COMPOSITION COMPRISING A SEMI-AROMATIC POLYAMIDE AND A CROSSLINKED POLYOLEFIN

The present invention relates to a composition comprising at least one semiaromatic polyamide and at least one crosslinked polyolefin, to a process for preparing it, and to its uses, especially in the manufacture of various objects, such as current consumer goods as for instance electrical, electronic, or automotive equipment, surgical apparatus, packaging, or else sports articles.

THE PRIOR ART AND THE TECHNICAL PROBLEM

In the automotive industry, for example, compositions based on one or more semiaromatic polyamides are seeing increasing use, owing to the noteworthy thermomechanical properties that such compositions confer on components produced from them.

In order to enhance simultaneously the preparation of these compositions and their conversion, especially through the use of an extrusion, coextrusion, or extrusion blow molding step, document WO 2011/015790 describes compositions comprising from 45% to 95% by weight of a semi-aromatic polyamide and from 5% to 55% by weight of at least one crosslinked polyolefin, the proportions by weight being given relative to the total weight of the composition.

The crosslinked polyolefin, which takes the form of a phase dispersed in the matrix formed by the semi-aromatic polyamide, originates from the reaction:
- of a product (A) comprising an unsaturated epoxide,
- of a product (B) comprising an unsaturated carboxylic anhydride or a polycarboxylic acid, and optionally
- of a product (C) comprising an unsaturated carboxylic acid or an alpha,omega-aminocarboxylic acid.

Although such compositions can effectively be converted by extrusion, coextrusion or extrusion blow molding, it is found that the inner and outer surfaces of the tubes extruded from these compositions do not always have a homogeneous appearance, and may carry surface defects which gives them a matt or even rough appearance, rather than a smooth appearance. An irregular appearance to these outer surfaces of the extruded tubes may thus have detrimental consequences for the mechanical properties of these tubes.

It is also possible to observe the formation of deposits on the screw and/or on the extrusion die, these deposits also being referred to as "die drool" during this conversion step. The formation of this die drool is not without effect on the production of the tubes and on the maintenance of the extrusion equipment.

There is therefore a genuine need to find new compositions formed from a dispersed, crosslinked polyolefin phase in a matrix of semi-aromatic polyamide(s) that allows not only conversion without formation of die drool, but also ensures that the extruded components obtained have smooth outer surfaces, with such components obviously retaining all of the advantages—in terms of mechanical strength, ageing resistance, and high-temperature stability—of the components formed from the prior-art compositions based on semi-aromatic polyamide(s).

BRIEF DESCRIPTION OF THE INVENTION

Surprisingly, the applicant has found that this need is achieved with a composition of the aforementioned type, namely a composition comprising at least one semiaromatic polyamide and at least one crosslinked polyolefin, the crosslinked polyolefin being obtained from at least one product (A) comprising an unsaturated epoxide and from at least one product (B) comprising an unsaturated carboxylic anhydride.

According to the invention, the composition has weight amounts of (A) and (B), written respectively as [A] and [B], such that the ratio [B]/[A] is between 3 and 14.

By virtue of this specific selection of the weight amounts of (A) and (B), the composition according to the invention can be converted by extrusion, coextrusion, or extrusion blow molding, and produces components, the outer surfaces of which are smooth, and does so without formation of die drool.

The experimental results show that improving the surface condition of extruded components, such as tubes, is linked directly to improving the morphology of the composition of the invention, relative to that of the composition described in document WO 2011/015790. Indeed, a study of the composition of the invention by scanning electron microscopy (SEM) shows that the composition of the invention exhibits a nodular morphology which is particularly fine and regular, with the nodules of crosslinked polyolefin being dispersed homogeneously within the semi-aromatic polyamide matrix.

This enhanced morphology endows the composition of the invention with a viscosity which is ideally suited to conversion by extrusion, especially since this viscosity exhibits only moderate change under heat. Accordingly, it is possible to produce components whose sizing, particularly thickness, is also optimized.

The invention also relates to a process for preparing the composition, and to its uses, particularly as a constituent layer of a structure which may be single-layer or multilayer.

DETAILED DESCRIPTION OF THE INVENTION

Further features, aspects, objectives, and advantages of the present invention will emerge more clearly from a reading of the description and examples which follow.

The nomenclature used in defining the polyamides is described in standard ISO 1874-1: 1992 "Plastics—Polyamide (PA) molding and extrusion materials—Part 1: Designation", particularly on page 3 (tables 1 and 2), and is well known to the skilled person.

It should also be noted that the expressions "between . . . and . . . " and "from . . . to . . . " that are used in the present description should be understood as including each of the stated endpoints.

The Semiaromatic Polyamide

The composition of the invention comprises at least one semiaromatic polyamide.

This semiaromatic polyamide comprises at least one first repeating semiaromatic unit which is obtained from the polycondensation of a diamine and an aromatic dicarboxylic acid.

The diamine comprises advantageously between 4 and 36 carbon atoms.

The diamine may be selected from aliphatic diamines, cycloaliphatic diamines, and alkylaromatic diamines. These diamines may be linear. They may also be branched and may comprise at least one alkyl branch on the main chain, and this alkyl branch may itself be linear or branched.

When the diamine is aliphatic and linear, it conforms to the formula $H_2N-(CH_2)_x-NH_2$. It may therefore be selected from butanediamine (x=4), pentane-diamine (x=5), hexanediamine, also called hexamethylenediamine (x=6), heptanediamine (x=7), octanediamine (x=8), nonanediamine (x=9), decanediamine (x=10), undecanediamine (x=11), dodecanediamine (x=12), tridecanediamine (x=13), tetradecanediamine (x=14), hexadecanediamine (x=16), octadecanediamine (x=18), octadecenediamine (x=18), eicosanediamine (x=20), docosanediamine (x=22), and the diamines obtained from fatty acids. Diamines of these kinds all have the advantage that they may be biobased and include organic carbon from biomass, as may be determined in accordance with standard ASTM D6866.

When the diamine is cycloaliphatic, it may be selected from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-amino-cyclohexyl)butane, bis(3-methyl-4-aminocyclohexyl)methane (BMACM or MACM), p-bis(aminocyclohexyl)-methane (PACM) and isopropylidenedi(cyclohexylamine) (PACP). The cycloaliphatic diamine may also include the following carbon skeletons: norbornylmethane, cyclohexylmethane, dicyclohexylpropane, di(methylcyclohexyl), di(methylcyclohexyl)propane. A nonexhaustive list of these cycloaliphatic diamines is given in the publication "Cycloaliphatic Amines" (Encyclopaedia of Chemical Technology, Kirk-Othmer, 4th Edition (1992), pp. 386-405).

When the diamine is alkylaromatic, it may be selected from 1,3-xylylene diamine and 1,4-xylylene diamine.

Advantageously, the diamine is an aliphatic diamine.

Preferably, the diamine is a linear aliphatic diamine.

The aromatic dicarboxylic acid may be selected from terephthalic acid (coded T), isophthalic acid (coded I), phthalic acid, and naphthalene acids. The aromatic dicarboxylic acids which have just been cited may also include one or more alkyl branches, and these alkyl branches may themselves be linear or branched. Included accordingly is 2-methylterephtalic acid.

Advantageously, the semiaromatic polyamide has a melting temperature of greater than 240° C., advantageously of between 240° C. and 310° C., and more particularly of between 260° C. and 280° C.

More particularly preferedly, the aromatic dicarboxylic acid is terephthalic acid (T).

According to one particular version of the invention, the semiaromatic polyamide may comprise more than 50 mol % of first repeating unit(s), advantageously more than 60 mol %.

It is possible more particularly to consider the use of a semiaromatic polyamide composed of 100 mol % of one or more first repeating units.

More particularly, according to a first aspect of the invention, this semiaromatic polyamide may be a homopolymer composed only of first repeating units obtained from the polycondensation reaction of a diamine and an aromatic dicarboxylic acid.

Accordingly, the semiaromatic polyamide may be selected from the homopolyamides 6.T, 9.T, 10.T, 11.T, 12.T, 14.T, 18.T, 6.I, 9.I, 10.I, 11.I, 12.I, 14.I, and 18.I.

According to a second aspect of the invention, this semiaromatic polyamide may be a copolymer composed of first repeating units obtained from the polycondensation reaction of a diamine and two aromatic dicarboxylic acids, or from the polycondensation reaction of two diamines and an aromatic dicarboxylic acid.

Accordingly, in the first case, the semiaromatic polyamide may be selected from the copolyamides 6.T/6.I, 9.T/9.I, 10.T/10.I, 11.T/11.I, and 12.T/12.I. In the second case, the semiaromatic polyamide may be selected from the copolyamides 6.T/9.T, 6.T/10.T, 6.T/11.T, 6.T/12.T, 9.T/10.T, 9.T/11.T, 9.T/12.T, 10.T/11.T, 10.T/12.T, and 11.T/12.T. A similar list may be drawn up by replacing the terephthalic acid (T) with isophthalic acid (I).

According to a third aspect of the invention, this semiaromatic polyamide may be a copolymer comprising first repeating units obtained from the polycondensation reaction of at least two diamines and at least two aromatic dicarboxylic acids.

In addition to this at least one first, semiaromatic repeating unit, which has just been detailed and which is obtained from the polycondensation of a diamine and an aromatic dicarboxylic acid, the semiaromatic polyamide in the composition of the invention may also comprise at least one second repeating unit, this second repeating unit being necessarily other than the first repeating unit or units.

This second repeating unit may be selected from the group consisting of a unit obtained from an aminocarboxylic acid, a unit obtained from a lactam, and a unit conforming to the formula (Ca diamine).(Cb difunctional acid), where "a" represents the number of carbon atoms in the diamine and "b" represents the number of carbon atoms in the difunctional acid.

Advantageously, a and b are each between 4 and 36.

When this second repeating unit is obtained from an aminocarboxylic acid, this aminocarboxylic acid may be selected from 9-aminononanoic acid (9), 10-aminodecanoic acid (10), 10-aminoundecanoic acid (11), 12-aminododecanoic acid (12), and 11-aminoundecanoic acid (11). The aminocarboxylic acid may also be branched. A possible example is N-heptyl-11-aminoundecanoic acid.

When this second repeating unit is obtained from a lactam, this lactam may be selected from pyrrolidinone, 2-piperidinone, enantholactam, caprylolactam, pelargolactam, decanolactam (10), undecanolactam (11), and lauryllactam (12).

When this second repeating unit is a unit conforming to the formula (Ca diamine).(Cb difunctional acid), it is obtained from the polycondensation of a diamine, the Ca diamine, and a dicarboxylic acid, the Cb difunctional acid, with the proviso that this dicarboxylic acid is not an aromatic dicarboxylic acid.

This Ca diamine may be selected from aliphatic diamines, cycloaliphatic diamines, and alkylaromatic diamines. These Ca diamines may be linear. They may also be branched and may include at least one alkyl branch on the main chain, and this alkyl branch may itself be linear or branched.

The diamines described above for preparing the first repeating unit may also be used as Ca diamine for obtaining the second repeating unit. Reference is therefore made to the paragraphs above relating to the diamines that may be used to obtain the first repeating unit for examples of Ca diamines which may be used for producing the second repeating unit.

The dicarboxylic acid (Cb difunctional acid) employed for obtaining the second repeating unit may be selected from aliphatic dicarboxylic acids and cycloaliphatic dicarboxylic acids. These dicarboxylic acids may be linear. They may also be branched and may comprise at least one alkyl branch on the main chain, and this alkyl branch may itself be linear or branched.

When the dicarboxylic acid (Cb difunctional acid) is aliphatic and linear, it may be selected from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic (16), octadecanedioic acid (18), octadecenedioc acid (18), eicosanedioic acid (20), docosanedioic acid (22), and fatty acid dimers containing 36 carbons.

The fatty acid dimers referred to above are dimerized fatty acids obtained by oligomerization or polymerization of unsaturated monobasic fatty acids with a long hydrocarbon chain (such as linoleic acid and oleic acid), as described in particular in document EP 0 471 566.

When the dicarboxylic acid (Cb difunctional acid) is cycloaliphatic, it may comprise the following carbon skeletons: norbornyl methane, cyclohexane, cyclohexylmethane, dicyclohexylmethane, dicyclohexylpropane, di(methylcyclohexyl), di(methylcyclohexyl)propane.

Accordingly, the second repeating unit of the semiaromatic polyamide may denote, in particular, the following units: 6, 11, 12, 6.10, 6.12, 6.14, 6.18, 10.10, 10.12, 10.14, 10.18, and 12.12.

According to a fourth aspect of the invention, this semiaromatic polyamide may be a copolymer composed of first repeating units obtained from the polycondensation reaction of a diamine and an aromatic dicarboxylic acid, and second repeating units obtained alternatively from an aminocarboxylic acid, or from a lactam, or from the polycondensation of a Ca diamine and a Cb difunctional acid as described above.

Among the combinations to which consideration may be given, the following copolyamides are of particularly marked interest: these are copolyamides conforming to one of the formulae selected from 11/6.T, 12/6.T, 6.10/6.T, 6.12/6.T, 10.10/6.T, 10.12/6.T, 12.12/6.T, 11/9.T, 12/9.T, 6.10/9.T, 6.12/9.T, 10.10/9.T, 10.12/9.T, 12.12/9.T, 11/10.T, 12/10.T, 6.10/10.T, 6.12/10.T, 10.10/10.T, 10.12/10.T, and 12.12/10.T.

According to a fifth aspect of the invention, this semiaromatic polyamide may be a copolymer comprising first repeating units obtained from the polycondensation reaction of at least one diamine and at least one aromatic dicarboxylic acid, and second repeating units obtained from at least one aminocarboxylic acid, at least one lactam, and/or from the polycondensation of a Ca diamine and a Cb difunctional acid as described above.

Among the multiplicity of combinations to which consideration may be given, mention may be made in particular of the copolyamides conforming to one of the formulae selected from:
  6/11/10.T, 6/12/10.T, 11/12/10.T, 11/6.10/10.T, 12/6.10/10.T, 11/10.6/10.T, 12/10.6/10.T, these copolyamides all comprising a first repeating 10.T unit and two second repeating units,
  6/6.T/10.T, 11/6.T/10.T, 12/6.T/10.T, these copolyamides all comprising two first repeating 6.T and 10.T units, and a second repeating unit,
  11/9.T/9.1, 12/9.T/9.1, 11/10.T/10.1, 12/10.T/10.1, these copolyamides all comprising two first repeating units and a second repeating unit,
  6/11/6.T/10.T, 11/12/6.T/10.T, these copolyamides both comprising first repeating 6.T and 10.T units, and two second repeating units.

In the context of the present invention, it is possible advantageously to use first and, where appropriate, second repeating units which are or will be obtained, entirely or partially, from diamines, dicarboxylic acids, aminocarboxylic acids and/or lactams which are biobased, in other words containing organic carbon originating from biomass, as may be determined in accordance with standard ASTM D6866.

The Crosslinked Polyolefin

The composition according to the invention comprises at least one crosslinked polyolefin, said crosslinked polyolefin being present as a phase dispersed in the matrix formed by the semiaromatic polyamide(s).

This crosslinked polyolefin originates from the reaction of two or of at least two products having groups which are reactive with one another.

More particularly, the crosslinked polyolefin is obtained from at least one product (A) comprising an unsaturated epoxide and from at least one product (B) comprising an unsaturated carboxylic anhydride.

Product (A) is advantageously a polymer comprising an unsaturated epoxide, this unsaturated epoxide being introduced into said polymer either by grafting or by copolymerization.

The unsaturated epoxide may in particular be selected from the following epoxides:
  aliphatic glycidyl ethers and esters such as allyl glycidyl ether, vinyl glycidyl ether, glycidyl maleate and itaconate, glycidyl acrylate and methacrylate, and
  alicyclic glycidyl ethers and esters such as 2-cyclohexen-1-yl glycidyl ether, diglycidyl cyclohexene-4,5-dicarboxylate, glycidyl cyclohexene-4-carboxylate, glycidyl 5-norbornene-2-methyl-2-carboxylate, and diglycidyl endo-cis-bicyclo[2.2.1]hept-5-ene-2,3-dicarboxylate.

According to a first form, the product (A) is a polyolefin grafted with an unsaturated epoxide. By polyolefin is meant a homopolymer or copolymer comprising one or more olefin units such as ethylene, propylene, but-1-ene, or any other alpha-olefin units. Examples of polyolefin include the following:
  polyethylene and, in particular, low density polyethylene (LDPE), high density polyethylene (HDPE), linear low density polyethylene (LLDPE), and very low density polyethylene (VLDPE); polypropylene; ethylene/propylene copolymers; elastomeric polyolefins such as ethylene-propylene (EPR or EPM) or ethylene-propylene-diene monomer (EPDM); or else metallocene polyethylenes obtained by single-site catalysis;
  styrene/ethylene-butene/styrene block copolymers (SEBS); styrene/butadiene/styrene block copolymers (SBS); styrene/isoprene/styrene block copolymers (SIS); or else styrene/ethylene-propylene/styrene block copolymers;
  copolymers of ethylene and at least one product selected from salts of unsaturated carboxylic acids, esters of unsaturated carboxylic acids, and vinyl esters of saturated carboxylic acids. The polyolefin may in particular be a copolymer of ethylene and alkyl(meth)acrylate or a copolymer of ethylene and vinyl acetate.

According to a second form, product (A) is a copolymer of alpha-olefin and an unsaturated epoxide and, advantageously, a copolymer of ethylene and an unsaturated epoxide. Advantageously, the amount of unsaturated epoxide may represent up to 15% by weight of the copolymer (A), with the amount of ethylene in turn representing at least 50% by weight of the copolymer (A).

Mention may be made more particularly of copolymers of ethylene, a saturated carboxylic acid vinyl ester, and an unsaturated epoxide, and also copolymers of ethylene, an alkyl(meth)acrylate, and an unsaturated epoxide. Preferably, the alkyl(meth)acrylate comprises from 2 to 10 carbon atoms. Examples of alkyl acrylates or methacrylates which can be used are, in particular, methyl acrylate, methyl methacrylate, ethyl acrylate, n-butyl acrylate, isobutyl acrylate, and 2-ethylhexyl acrylate.

According to one advantageous version of the invention, product (A) is a copolymer of ethylene, methyl acrylate, and glycidyl methacrylate, or a copolymer of ethylene, n-butyl acrylate, and glycidyl methacrylate. It will be possible in particular to use the product sold by Arkema under the name Lotader® AX8900.

According to another form of the invention, product (A) is a product having two epoxide functions, such as, for example, the diglycidyl ether of bisphenol A (DGEBA).

Product (B) is advantageously a polymer comprising an unsaturated carboxylic anhydride, this unsaturated carboxylic anhydride being introduced into said polymer either by grafting or by copolymerization.

Examples of unsaturated dicarboxylic anhydrides which can be used as constituents of product (B) are, in particular, maleic anhydride, itaconic anhydride, citraconic anhydride, and tetrahydrophthalic anhydride.

According to a first form, product (B) is a polyolefin grafted with an unsaturated carboxylic anhydride. As was seen above, a polyolefin is a homopolymer or copolymer comprising one or more olefin units such as ethylene, propylene, but-1-ene, or any other alpha-olefin units. This polyolefin may in particular be selected from the examples of polyolefins listed above for product (A), when the latter is a polyolefin grafted with an unsaturated epoxide.

According to a second form, product (B) is a copolymer of alpha-olefin and of an unsaturated carboxylic anhydride, and, advantageously, a copolymer of ethylene and an unsaturated carboxylic anhydride. Advantageously, the amount of unsaturated carboxylic anhydride may represent up to 15% by weight of the copolymer (B), with the amount of ethylene itself representing at least 50% by weight of the copolymer (B).

Mention may be made more particularly of copolymers of ethylene, a saturated carboxylic acid vinyl ester, and an unsaturated carboxylic anhydride, and also of copolymers of ethylene, an alkyl(meth)acrylate, and an unsaturated carboxylic anhydride. Preferably, the alkyl(meth)acrylate comprises from 2 to 10 carbon atoms. The alkyl acrylate or methacrylate may be selected from those cited above for product (A).

According to one advantageous version of the invention, product (B) is a copolymer of ethylene, an alkyl(meth) acrylate, and an unsaturated carboxylic anhydride. Preferably, product (B) is a copolymer of ethylene, ethyl acrylate, and maleic anhydride, or a copolymer of ethylene, butyl acrylate, and maleic anhydride. It will in particular be possible to use the products sold by Arkema under the names Lotader® 4700 and Lotader® 3410.

It would not be a departure from the scope of the invention if a part of the maleic anhydride in the product (B), according to the first and second forms described above, was partly hydrolyzed.

According to the invention, the weight amounts of product (A) and of product (B), which are written respectively as [A] and [B], are such that the ratio [B]/[A] is between 3 and 14 and, advantageously, between 4 and 9.

In the composition according to the invention, the crosslinked polyolefin may also be obtained from products (A) and (B) as described above and from at least one product (C), this product (C) comprising an unsaturated carboxylic acid or an alpha,omega-aminocarboxylic acid.

Product (C) is advantageously a polymer comprising an unsaturated carboxylic acid or an alpha,omega-aminocarboxylic acid, with one or other of these acids being introduced into said polymer by copolymerization.

Examples of unsaturated carboxylic acids which can be used as constituents of product (C) are, in particular, acrylic acid, methacrylic acid, and the carboxylic anhydrides cited above as constituents of product (B), these anhydrides being completely hydrolyzed.

Examples of alpha,omega-aminocarboxylic acids which can be used as constituents of product (C) are, in particular, 6-aminohexanoic acid, 11-aminoundecanoic acid, and 12-aminododecanoic acid.

Product (C) may be a copolymer of alpha-olefin and an unsaturated carboxylic acid, and, advantageously, a copolymer of ethylene and an unsaturated carboxylic acid. Included in particular are the completely hydrolyzed copolymers of product (B).

According to one advantageous version of the invention, product (C) is a copolymer of ethylene and (meth)acrylic acid, or a copolymer of ethylene, an alkyl(meth)acrylate, and (meth)acrylic acid. The amount of (meth)acrylic acid may represent up to 10% by weight and, preferably, from 0.5 to 5% by weight of the copolymer (C). The amount of alkyl (meth)acrylate is generally between 5 and 40% by weight of the copolymer (C).

Preferably, product (C) is a copolymer of ethylene, butyl acrylate, and acrylic acid. It will be possible in particular to use the product sold by BASF under the name Lucalene® 3110.

According to the invention, the weight amounts of product (A), of product (B), and of product (C), which are written respectively as [A], [B] and [C], are such that the ratio [B]/([A]+[C]) is between 1.5 and 8, the weight amounts of products (A) and (B) being such that [C]≤[A].

Advantageously, the ratio [B]/([A]+[C]) is between 2 and 7.

The dispersed crosslinked polyolefin phase may of course come from the reaction of one or more products (A) with one or more products (B) and, where appropriate, with one or more products (C).

As already described in document WO 2011/015790, it is possible to use catalysts which accelerate the reaction between the reactive functions of the products (A) and (B). Reference will therefore be made to the teaching of said document with regard to examples of catalysts, which may be used in a weight amount of between 0.1 and 3% and, advantageously, between 0.5 and 1% of the total weight of the products (A), (B) and, where appropriate, (C).

The composition according to the invention comprises, relative to the total weight of the composition:
from 45 to 95% by weight, advantageously from 55 to 90% by weight, of semiaromatic polyamide(s), and
from 5 to 55% by weight, advantageously from 10 to 45% by weight, of crosslinked polyolefin(s).

This composition may be solely composed of these two classes of compounds, namely at least one semiaromatic polyamide, and at least one crosslinked polyolefin.

However, the composition may also comprise other compounds in addition to those which have just been cited. The composition of the invention may, in particular, further comprise at least one additive and/or at least one further polymer.

The Additives

The composition of the invention may further comprise at least one additive as well.

This additive may in particular be selected from processing aids, plasticizers, fillers, stabilizers (UV and/or heat), dyes, mold release agents, flame retardants, surfactants, optical brighteners, antioxidants, and mixtures thereof.

Among the processing aids, mention may be made of stearates, such as calcium or zinc stearates, natural waxes, and polymers comprising tetrafluoroethylene (TFE).

The weight proportion of processing aids is conventionally between 0.01 and 0.3% by weight, advantageously between 0.02 and 0.1% by weight, relative to the total weight of the composition.

Among the plasticizers, use may be made in particular of benzenesulfonamide derivatives, among them n-butylbenzenesulfonamide (BBSA).

The weight proportion of plasticizer may represent up to 25% by weight and is advantageously between 3 and 20% by weight, relative to the total weight of the composition.

The fillers include silica, graphite, expanded graphite, carbon black, carbon fibers, glass beads, kaolin, magnesia, slags, talc, nanofillers (carbon nanotubes), pigments, metal oxides (titanium oxide), metals, and fibers (aramids, glass, carbon).

Depending on the nature of the fillers, the amount thereof may represent up to 50% by weight, advantageously, up to 30% by weight, of the total weight of the composition.

The Further Polymers

A composition in accordance with the invention may further comprise one or more further polymers, and in particular at least one third polymer, such a polymer being different from the semiaromatic polyamide(s) and from the crosslinked polyolefin(s) referred to above.

Advantageously, this further polymer may in particular be selected from a polyamide, a polyamide-block-ether, a polyetheramide, a polyesteramide, a polyphenylene sulfide (PPS), a polyphenylene oxide (PPO), a noncrosslinked polyolefin (in contrast to the crosslinked polyolefin considered above), a fluoropolymer, and mixtures thereof. With regard to the noncrosslinked polyolefins, mention may be made of the polyolefins described in the section on "the crosslinked polyolefin", in other words products (A), (B), or (C), which are in that case used alone so as not to crosslink, it being noted that these noncrosslinked polyolefins are known, moreover, as impact modifiers.

The further polymer may likewise be selected from starch, which may be modified and/or formulated, cellulose or its derivatives, such as cellulose acetate or cellulose ethers, polylactic acid, polyglycolic acid, and polyhydroxyalkanoates.

Preferably, the further polymer is selected from aliphatic polyamides and polyamide-block-ethers.

The composition may contain up to 20% by weight, relative to the total weight of the composition, of at least one further polymer.

The invention also relates to a process for preparing a composition as defined above. According to this process, the composition may be prepared by any method allowing a homogeneous mixture to be obtained, such as extrusion in the melt state, compacting, or else roll milling.

More particularly, the composition of the invention may be prepared by mixing in the melt state the semiaromatic polyamide(s) and the products (A), (B), and optionally (C) for producing the crosslinked polyolefin(s).

The optional additives and/or further polymers may for their part be introduced either at the same time as the semiaromatic polyamide(s) and products (A), (B), and, where appropriate, (C), or in a subsequent step.

Advantageously, the composition may be obtained in pellet form by compounding, in particular by means of a twin-screw extruder, a co-kneading apparatus, or an internal mixer. These pellets of the composition according to the invention obtained by the above-described preparation process may subsequently be converted using tools known to the skilled person (such as an injection molding machine or an extruder) to the form of filaments, tubes, films and/or moldings.

The process for preparing the composition of the invention may also use a twin-screw extruder which, without intermediate pelletizing, feeds an injection molding machine or an extruder for the production of filaments, tubes, films and/or moldings.

The invention therefore also relates to a material or article obtained from a composition as defined above by a known conversion process such as injection molding, extrusion, extrusion blow molding, coextrusion, or multiple injection.

The invention likewise relates to the use of a composition as described above for forming a structure. This structure may be single-layer when formed only from the composition of the invention. This structure may also be multilayer, when it comprises at least two layers and when at least one of these different layers is composed of the composition of the invention.

The invention likewise relates to a component formed wholly or partly from the composition of the invention. This component may comprise the immediately aforementioned single-layer or multilayer structure. Such a component may in particular be an injection molded component and, more particularly, an extruded, coextruded, or extrusion-blow molded component. It may in particular take the form of a tube, a pipe, a reservoir, fibers, a film, a sheet, or a plate.

The invention relates, lastly, to the use of such a component for storing or conveying a fluid. A fluid of this kind may in particular be selected from a fuel, a refrigerant, a cooling liquid, a brake fluid, an oil, a lubricant, a hydraulic fluid, a liquid based on urea solution, a chemical product, water, or else a gas or gaseous emanations or vapors, which gas may be at overpressure or at underpressure.

The component formed wholly or partly from the composition of the invention may in particular be used for producing all or part of components of surgical equipment, packaging, sports or leisure articles. This component may also be used for producing all or part of elements of electrical and electronic goods, industrial equipment for the storage, transport, or transfer of fluids such as those listed above, or else automobile or truck equipment.

Other objectives and advantages of the present invention will emerge from a reading of the examples which follow, which are given as an indication and in no way as a limitation, and from an examination of the figures.

EXAMPLES

Formulation of the Compositions

Figure 1:
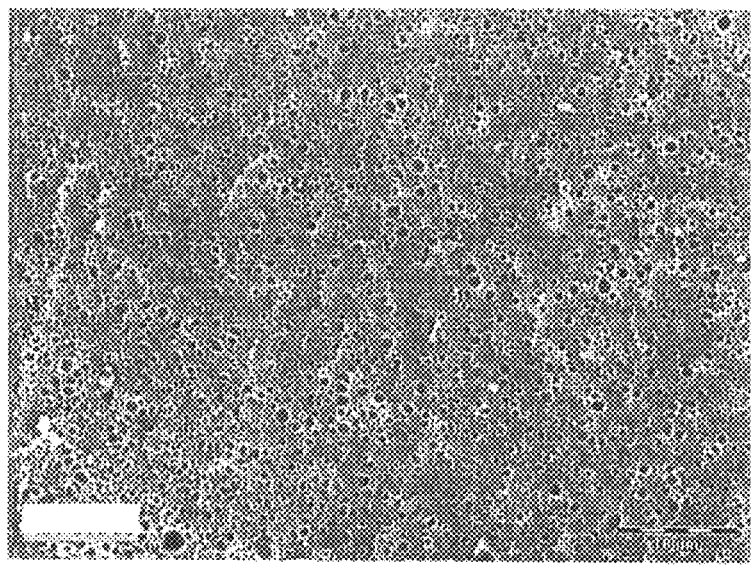
FIG. 1 is a scanning electron micrograph (SEM) of a sample of composition 9, following dissolution of the dispersed, crosslinked polyolefin phase by treatment with xylene at 150° C. for 30 minutes.

The compositions tested were prepared from the following products:

11/10.T: semiaromatic polyamide, with a molar 11/10.T ratio of 0.7, obtained by polycondensation of 11-aminocarboxylic acid, 1,10-decanediamine, and terephthalic acid, having a glass transition temperature Tg of 88° C., a melting temperature Tf of 260° C., an intrinsic viscosity of 1.22 (measured according to standard ISO 307), and an enthalpy of fusion of 47 J/g Lotader AX8900: copolymer of ethylene, methyl acrylate, and glycidyl methacrylate (Et/MA/GMA—68/24/8 by weight), corresponding to product (A)

"−": the surfaces of the tubes are rough and there is die drool;

"+": the surfaces of the tubes are smooth but matt and there is little die drool; and "++": the surfaces of the tubes are smooth and shiny and there is very little die drool, or none at all.

TABLE 1

| | Composition | | | | | | | | |
|---|---|---|---|---|---|---|---|---|---|
| | 1 | 2 | 3 | 4 | 5 | 6 | 7 | 8 | 9 |
| 11/10.T | 69.3 | 69.3 | 69.3 | 69.3 | 69.3 | 69.3 | 69.3 | 69.3 | 69.3 |
| (B) Lotader 4700 | 10 | 15 | 20 | 24 | 26 | | | | |
| (B) Lotader 3410 | | | | | | 20 | 22.5 | 25 | 24 |
| (A) Lotader AX8900 | 10 | 7.5 | 10 | 4 | 4 | 10 | 7.5 | 5 | 4 |
| (C) Lucalene 3110 | 10 | 7.5 | | 2 | | | | | 2 |
| Iodine 201 | 0.7 | 0.7 | 0.7 | 0.7 | 0.7 | 0.7 | 0.7 | 0.7 | 0.7 |
| [B]/[A] | 1 | 2 | 2 | 6 | 6.5 | 2 | 3 | 5 | 6 |
| [B]/([A] + [C]) | 0.5 | 1 | | 4 | | | | | 4 |
| Dv (μm) | 18.8 | 2.2 | 0.63 | 0.74 | 0.64 | 0.49 | 0.7 | 0.52 | 0.52 |
| MFI (g/10 min) | <1 | 2.2 | <1 | 4.7 | 2.9 | <1 | 1 | 1.5 | 2.3 |
| Plate/plate initial (Pa · s) | 4300 | 3590 | 4200 | 2213 | 2250 | 5970 | 4710 | 3500 | 3000 |
| Plate/plate 30 min (Pa · s) | 7800 | 7380 | 6340 | 3500 | 3850 | 7150 | 5770 | 4140 | 5020 |
| Δ plate/plate | 3500 | 3790 | 2140 | 1287 | 1600 | 1180 | 1060 | 640 | 2020 |
| Tube appearance and drool | − | + | + | ++ | ++ | + | ++ | ++ | ++ |

Lotader 4700: copolymer of ethylene, ethyl acrylate, and maleic anhydride (Et/EA/MAH—69/30/1 by weight), corresponding to product (B)

Lotader 3410: copolymer of ethylene, butyl acrylate, and maleic anhydride (Et/BA/MAH—81/16/3 by weight), corresponding to product (B)

Lucalène 3110: copolymer of ethylene, butyl acrylate, and acrylic acid (Et/BA/AA—88/8/4 by weight), corresponding to product (C)

Iodine 201: antioxidant additive based on KI and CuI

Compositions 1 to 9 were all prepared on a twin-screw extruder, according to the formulations set out in detail in table 1 below, the amount of crosslinked polyolefin being equal to 30% by weight of the total weight of each of compositions 1 to 9.

Compositions 4, 5, and 7 to 9 are compositions in accordance with the invention, whereas compositions 1, 2, 3, and 6 are compositions outside the invention. In particular, composition 2 corresponds to the composition E described in document WO 2011/015790.

Tests Conducted

The morphology of compositions 1 to 9 was studied by scanning electron microscopy (SEM). The volume-average diameters of the nodules of crosslinked polyolefin, denoted Dv, were measured and reported in table 1.

The index of flow in the melt state, also called fluidity index or Melt Flow Index (MFI), was measured in accordance with standard ASTM D1238 at 300° C., under a weight of 5 kg, and the values reported in table 1.

Plate/plate viscosity measurements were carried out at 300° C. (10 rad/s). The initial values and values after 30 minutes as well as the difference between the values at 30 minutes and initial values are reported in table 1.

Figure 2:
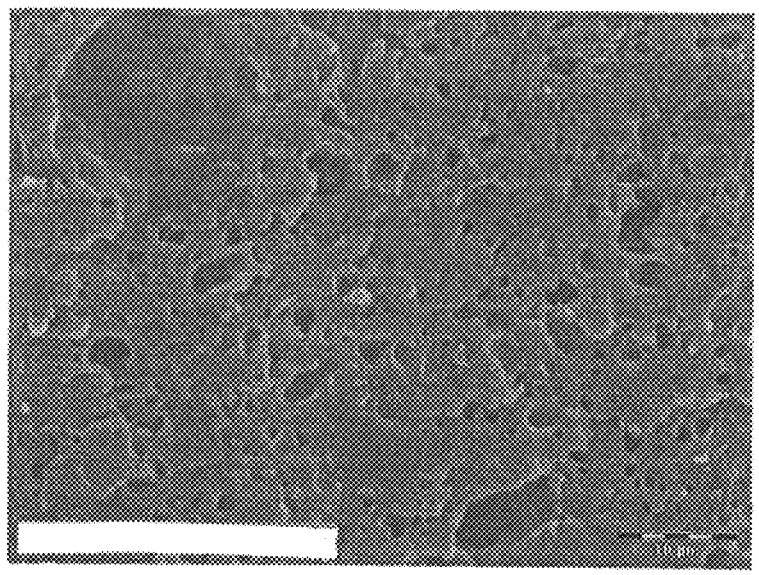
FIG. 2 is a scanning electron micrograph (SEM) of a sample of composition 1, following dissolution of the dispersed, crosslinked polyolefin phase by treatment with xylene at 150° C. for 30 minutes, these two micrographs being on the same scale.

Compositions 1 to 9 were then extruded in the form of tubes with a diameter of 8 mm and a thickness of 1 mm (8*1 mm). During this extrusion conversion, deposits ("drool") was observed to form on the extrusion die. The appearance of the inner and outer surfaces of the extruded tubes was also examined. The observations are reported in table 1 below, in which the following abbreviations each has the following meanings:

It is observed that, in contrast to comparative compositions 1 and 2, inventive compositions 4, 5, and 7 to 9 all have a fine morphology, with nodules of crosslinked polyolefin that have a volume-average diameter Dv whose value is less than 1 μm. Reference may be made in particular to FIG. 1, which clearly shows the particularly fine dispersion of the nodules in composition 9, relative to that of the nodules in composition 1 as illustrated in FIG. 2.

In the case of compositions 1 to 5 on the one hand and of compositions 6 to 9 on the other, it is seen that the greater [B]/[A] or [B]/([A]+[C]), the finer the morphology (Dv). Similarly, the higher [B]/[A] or [B]/([A]+[C]), the better the rheology, the reason is that the composition is more fluid and more stable (meaning that it does not change very much under heat); its conversion by extrusion is easier.

Furthermore it is observed that in the extrusion conversion of inventive compositions 4, 5, and 7 to 9, there was no (or very little) development of drool on the extrusion die, and that the tubes extruded from these compositions 4, 5, and 7 to 9 all had an inner surface and an outer surface that were smooth and shiny.

The invention claimed is:

1. A composition comprising 55-90% of at least one semiaromatic polyamide 11/10.T and 10-45% of at least one crosslinked polyolefin, the crosslinked polyolefin being obtained from:
   at least one product (A) that is a copolymer of ethylene, methyl acrylate, and glycidyl methacrylate, and
   at least one product (B) that is a copolymer of ethylene, ethyl acrylate and maleic anhydride or a copolymer of ethylene, butyl acrylate and maleic anhydride,
   wherein the weight amounts of (A) and (B), written respectively as [A] and [B], are such that the ratio [B]/[A] is between 4 and 9.

2. The composition as claimed in claim 1, wherein the crosslinked polyolefin is obtained from the products (A), (B), and from at least one product (C) comprising an unsaturated carboxylic acid or an alpha,omega-aminocarboxylic acid, the weight amounts of (A), (B) and (C), written respectively as [A], [B] and [C], being such that [C]≤[A] and the ratio [B]/([A]+[C]) is between 1.5 and 8.

3. The composition as claimed in claim 2, wherein the product (C) is a copolymer of alpha-olefin and an unsaturated carboxylic acid.

4. The composition as claimed in claim 3, wherein the product (C) is a copolymer of ethylene and (meth)acrylic acid, or a copolymer of ethylene, an alkyl (meth)acrylate, and (meth)acrylic acid.

5. The composition of claim 2, wherein [B]/([A]+[C]) is 2 to 7.

6. The composition as claimed in claim 1, further comprising at least one additive that is a processing aid, plasticizer, filler, stabilizer, dye, mold release agent, flame retardant, surfactant, optical brightener, antioxidant, or mixture thereof.

7. The composition as claimed in claim 1, comprising at least one additional polymer that is a polyamide, a polyamide-block-ether, a polyetheramide, a polyesteramide, a polyphenylene sulfide, a polyphenylene oxide, a noncrosslinked polyolefin, or a fluoropolymer.

8. A process for preparing the composition as defined in claim 1, comprising melt-state mixing the semiaromatic polyamide(s) and the products (A), (B), and optionally (C) and obtaining the crosslinked polyolefin(s).

9. A single-layer structure or at least one layer of a multilayer structure, wherein at least one layer is a composition according to claim 1.

* * * * *